United States Patent
Chang et al.

(10) Patent No.: US 10,204,596 B2
(45) Date of Patent: Feb. 12, 2019

(54) DISPLAY CONTROL FOR TRANSPARENT DISPLAY

(71) Applicant: MEDIATEK INC., Hsin-Chu (TW)

(72) Inventors: Chih-Kai Chang, Taichung (TW); Tsu-Ming Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 75 days.

(21) Appl. No.: 15/381,248

(22) Filed: Dec. 16, 2016

(65) Prior Publication Data

US 2017/0177150 A1 Jun. 22, 2017

Related U.S. Application Data

(60) Provisional application No. 62/270,077, filed on Dec. 21, 2015.

(51) Int. Cl.
*G09G 5/30* (2006.01)
*G06F 3/147* (2006.01)

(52) U.S. Cl.
CPC ............... *G09G 5/30* (2013.01); *G06F 3/147* (2013.01); *G09G 2340/045* (2013.01); *G09G 2340/10* (2013.01); *G09G 2354/00* (2013.01); *G09G 2360/144* (2013.01); *G09G 2360/16* (2013.01)

(58) Field of Classification Search
CPC .... G09G 5/30; G09G 3/147; G09G 2340/045; G09G 2340/10
See application file for complete search history.

(56) References Cited

U.S. PATENT DOCUMENTS

| 7,817,165 B1* | 10/2010 | Donham | G09G 5/363 345/611 |
| 2010/0095207 A1* | 4/2010 | Bonnat | G06F 3/0482 715/702 |
| 2014/0184577 A1* | 7/2014 | Kim | G09G 5/10 345/207 |

FOREIGN PATENT DOCUMENTS

| CN | 103688304 A | 3/2014 |
| CN | 103718549 A | 4/2014 |
| TW | 201324484 A | 6/2013 |
| TW | 201608280 A | 3/2016 |

* cited by examiner

*Primary Examiner* — Lisa S Landis
(74) *Attorney, Agent, or Firm* — McClure, Qualey & Rodack, LLP

(57) ABSTRACT

A controller for generating an output image to be rendered on a transparent display panel is provided. The controller is configured to: receive an input image; calculate an opacity of each pixel in the input image according to a predetermined equation associated with the transparent display panel; determine a display mode of one or more portions of the input image according to transparency indication information associated with the one or more portions of the input image, wherein the display mode corresponds to transparency of the one or more portions in the input image; and obtain the output image to be displayed on the transparent display panel according to the determined display mode of the one or more portion of the input image.

16 Claims, 10 Drawing Sheets

DISPLAY CONTROL FOR TRANSPARENT DISPLAY

CROSS REFERENCE TO RELATED APPLICATIONS

This application claims the benefit of U.S. Provisional Application No. 62/270,077 filed on Dec. 21, 2015, the entirety of which is incorporated by reference herein.

BACKGROUND OF THE INVENTION

Field of the Invention

The present invention relates to image processing, and, in particular, to a transparency control method and an associated semiconductor device for transparent displays.

Description of the Related Art

As technology has advanced, various display panels have been developed to satisfy the requirements of users. Conventional display panels are non-transparent display panels. The key idea is to use the light-emitting component in the display panel for displaying images. However, since conventional display panels are non-transparent and have no light penetrability, objects behind the conventional display panels are not viewable for the user.

A transparent display is a see-through display that allows users to see both the image displayed on the transparent display as well as the background view behind the transparent display. For example, transparent displays can be implemented using liquid-crystal display (LCD) or organic light-emitting diode (OLED) display technologies. Various image and video processing techniques have been developed for non-transparent displays, such as color enhancement, image scaling, de-noise, sharpness enhancement, motion de-blurring. However, image rendering is different in transparent displays and non-transparent displays because of the image transparency on the transparent displays, and there is no particular image processing method that has been designed for use with transparent displays.

Accordingly, there is a need for a transparency control method to enhance image quality and transmission efficiency on transparent displays.

BRIEF SUMMARY OF THE INVENTION

A detailed description is given in the following embodiments with reference to the accompanying drawings.

In an exemplary embodiment, a controller for generating an output image to be rendered on a transparent display panel is provided. The controller is configured to: receive an input image; calculate an opacity of each pixel in the input image according to a predetermined equation associated with the transparent display panel; determine a display mode of one or more portions of the input image according to transparency indication information associated with the one or more portions of the input image, wherein the display mode corresponds to transparency of the one or more portions in the input image; and obtain the output image to be displayed on the transparent display panel according to the determined display mode of the one or more portion of the input image.

In another exemplary embodiment, a transparency control method for controlling transparency of an output image to be rendered on a transparent display panel is provided. The method includes the steps of: receiving an input image; calculating an opacity of each pixel in the input image according to a predetermined equation associated with the transparent display panel; determining a display mode of one or more portions of the input image according to transparency indication information associated with the one or more portions of the input image, wherein the display mode corresponds to transparency of the one or more portions in the input image; and obtaining the output image to be displayed on the transparent display panel according to the determined display mode of the one or more portions of the input image.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
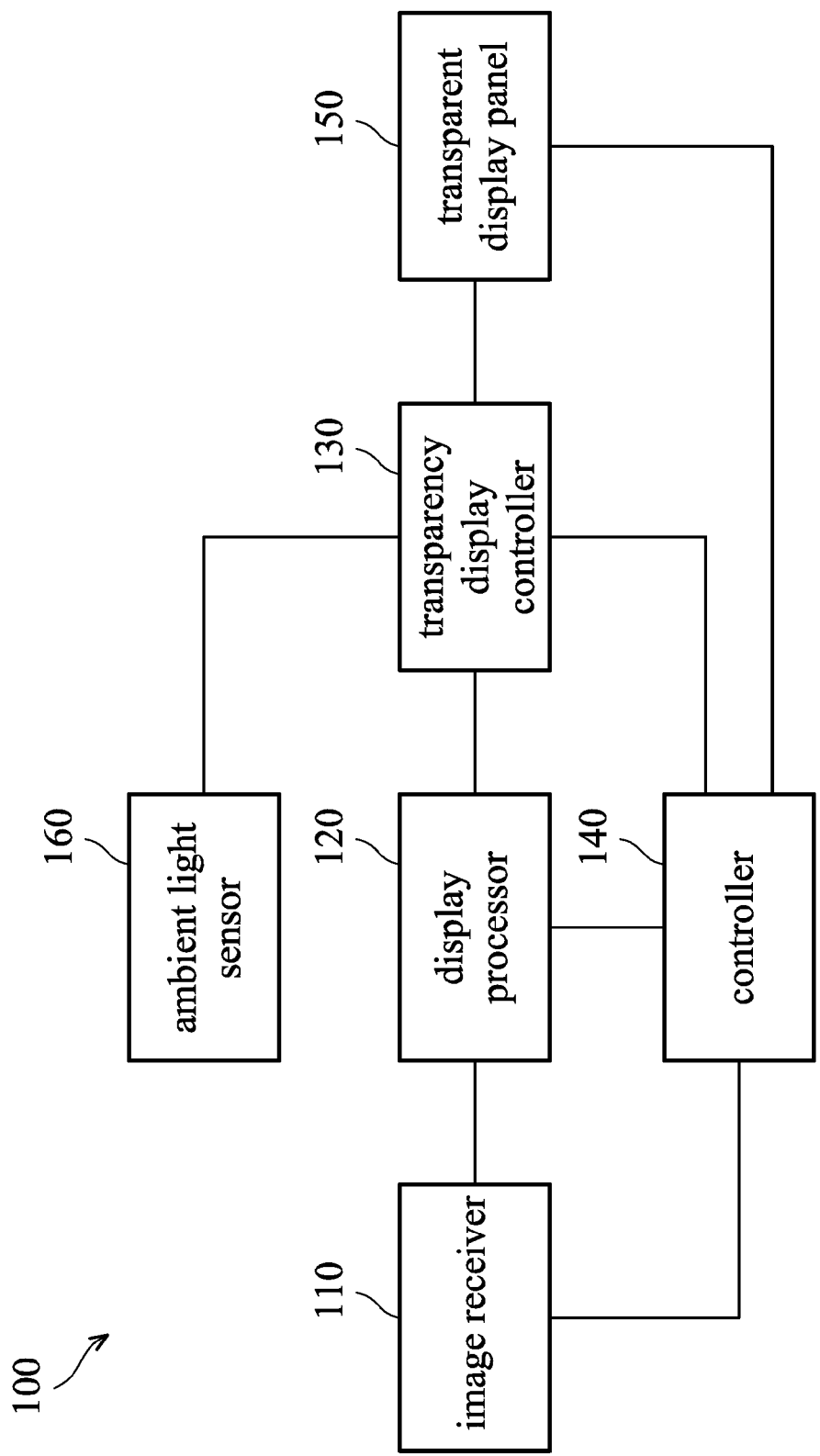
FIG. 1 is a block diagram of a display apparatus in accordance with an embodiment of the invention.

FIG. 1 is a block diagram of a display apparatus in accordance with an embodiment of the invention. As shown in FIG. 1, the display apparatus 100 includes an image receiver 110, a display processor 120, a transparency display controller 130, a controller 140, and a transparent display panel 150. The image receiver 110 receives an image signal and the display processor 120 processes the image signal received by the image receiver. The controller 140 such as a microcontroller may control overall elements of the display apparatus 100. In an embodiment, the display apparatus 100 further includes an ambient light sensor 160 that is configured to detect ambient light (e.g. ambient light level) around the display apparatus 100.

In some embodiments, the image receiver 110 may include one or more image sensors, that may be complementary metal-oxide-semiconductor (CMOS) sensors or charge-coupled device (CCD) sensors, for capturing images, and the display processor 120 processes the images from the image receiver 110.

In some alternative embodiments, the image receiver 110 receives one or more image signals in a wired/wireless manner from an image source (not shown) and transmits the image signals to the display processor 120. The signals and/or images may be of various types depending on the standard of the received image signals and the embodiment type of the display apparatus 100. For example, the image receiver 110 may receive digital image signals according to a high-definition multimedia interface (HDMI) or a DisplayPort interface, receive analog image signals via an RCA, S-video, or composite interface, or receive an image data packet stream from a streaming server (not shown).

In an embodiment, the display processor 120 includes an image processing pipeline and/or a video processing pipeline that are configured to perform associated image and video processing on the image signal from the image receiver 110, and the display processor 120 outputs the processed images signal to the transparency display controller 130. The display processor 120 may be implemented as a system-on-chip (SoC), an application specific integrated circuit (ASIC), a field-programmable gate array (FPGA) that integrates the foregoing functions, or as an image processing board (not shown) that is formed by mounting individual elements on a printed circuit board (PCB) (not shown) to perform the foregoing image and video processing operations.

For example, the aforementioned image and video processing performed by the display processor 120 can be image and video processing techniques that are used for traditional non-transparent displays, such as image encoding and decoding, video encoding and decoding, and image effect enhancement. The output image of the display processor 120 can be formed of different image layers such as a user interface layer, a static image layer, a video layer, a gaming image layer, etc. The transparency display controller 130 performs operations of one or more transparency control methods on the image output from the display processor 120 to generate an output image. In some embodiments, the input image from the display processor 120 can be divided into various areas such as the UI area, a static image area, a video area, a gaming area, etc., and the transparency display controller 130 performs operations of one or more transparency control methods on the different areas of the input image. Details for the transparency control methods will be described later. For purposes of description, an output image including different areas will be described in the following embodiments.

The transparent display panel 150 is configured to display output images from the transparency display controller 130. In some embodiments, the transparency display controller 130 can be a stand-alone integrated chip, an application-specific integrated circuit, or a system-on-chip (SoC). In some embodiments, the transparency display controller 130 can be integrated into the display processor 120 which may be a system-on-chip (SoC). In some embodiments, the transparency display controller 130 can be integrated into a driver IC (not shown) of the transparent display panel 150. Specifically, the transparency display controller 130 can be an integrated circuit or a SoC to control rendering of the transparent display panel 150, and thus transparency of the image to be rendered on the transparent display panel 150 is controlled by the transparency display controller 130.

In an embodiment, the transparency display controller 130 may perform some transparency control functions out the input images from the display processor 120, such as area adaptive alpha control, ambient light adaptive alpha control, hand-follower, transparent and opaque mode switch control, and foreground and background alpha control. For example, one or more portions of the input image of the transparency display controller 130 can be set to a transparent mode or an opaque mode by the user. When a specific portion of the input image of the transparency display controller 130 is set to the transparent mode, the specific portion of the input image to be rendered on the transparent display panel 150 tends to be more transparent. Conversely, when a specific portion of the input image of the transparency display controller 130 is set to the opaque mode, the specific portion of the input image to be rendered on the transparent display panel 150 tends to be more opaque.

It should be noted that the brightness of a "transparent" pixel may be 255 or 0 in each color channel if an 8-bit color depth is used. For example, if the brightness of a transparent pixel displayed on the transparent display panel 150 is 255, the transparency thereof will decrease gradually as the brightness of the pixel is gradually decreased to 0. Conversely, if the brightness of a transparent pixel displayed on the transparent display panel 150 is 0, the transparency thereof will gradually decrease as the brightness of the pixel is gradually increased to 255. For purposes of description, the brightness of a transparent pixel is defined as 255 in the following embodiments.

Figure 2A:
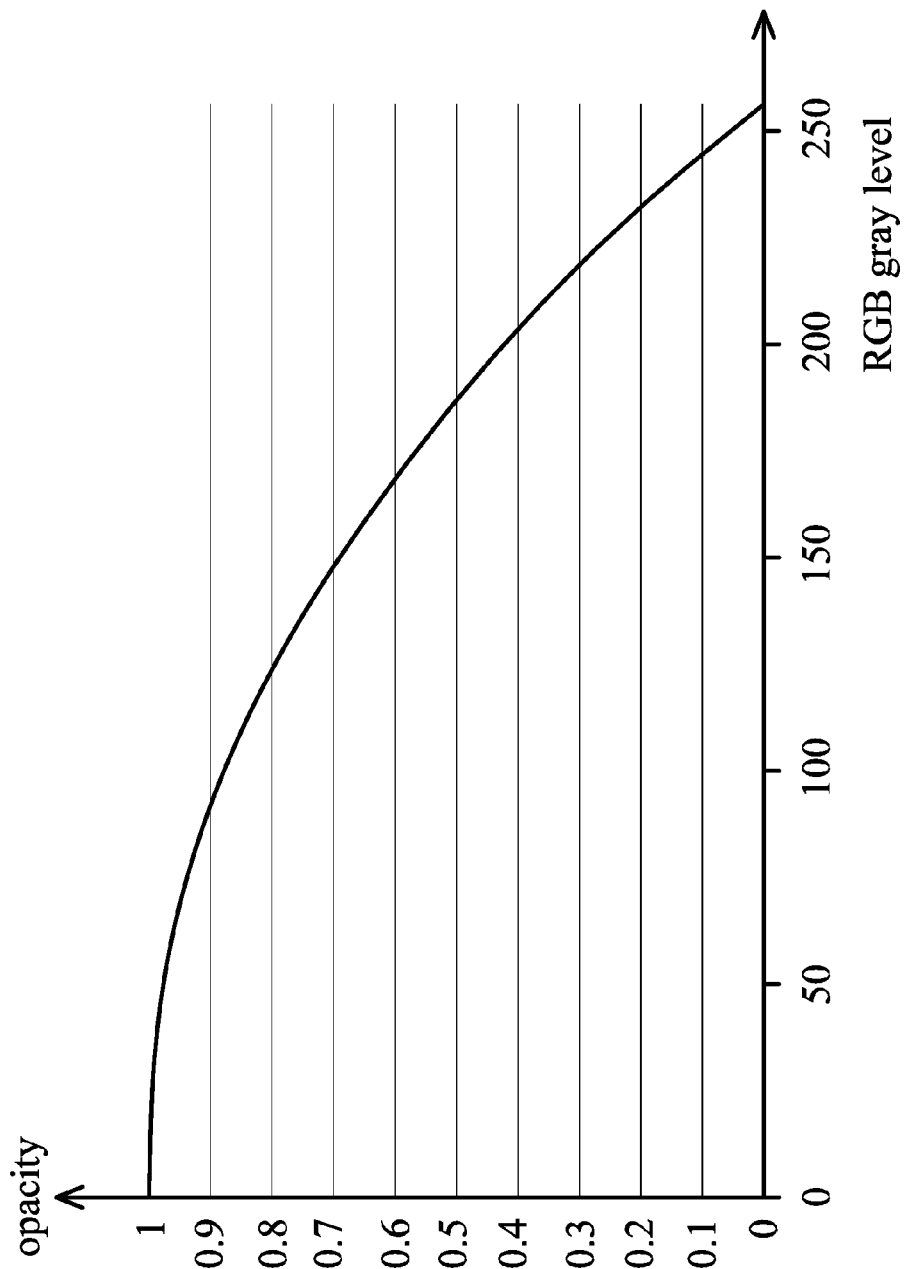
FIG. 2A is a diagram of an opacity curve in accordance with an embodiment of the invention.

FIG. 2A is a diagram of an opacity curve of the transparent display panel in accordance with an embodiment of the invention.

In an embodiment, the opacity of a specific pixel of an image displayed on the transparent display panel 150 can be estimated according to the pre-measured display characteristics of the transparent display panel 150. The opacity of a specific pixel can be expressed using the following predetermined equation associated with the transparent display panel 150:

$$\text{Opacity} = f(R, G, B); \quad \text{(equation 1)}$$

where R, G, and B denote the brightness of the red, green, and blue sub-pixels of the specific pixel. The opacity is a numeric value between 0 and 1. For example, as shown in FIG. 2A, when the gray level of the specific pixel in the RGB image is close to 255, the opacity of the specific pixel will be close to 0, i.e. the specific pixel is "transparent". When the gray level of the specific pixel in the RGB image is close to 0, the opacity of the specific pixel will be close to 1 i.e. the specific pixel is "opaque", as shown in FIG. 2A. It should be noted that calculation for the opacity for a given pixel in the input image can be obtained from the predetermined equation, such as a predetermined look-up table based on the values of red, green, and blue sub-pixels of the given pixel (e.g. equation 1 and FIG. 2A). In some embodiments, the opacity look-up operation can be performed before determining whether the transparent mode or the opaque is used.

Figure 2B:
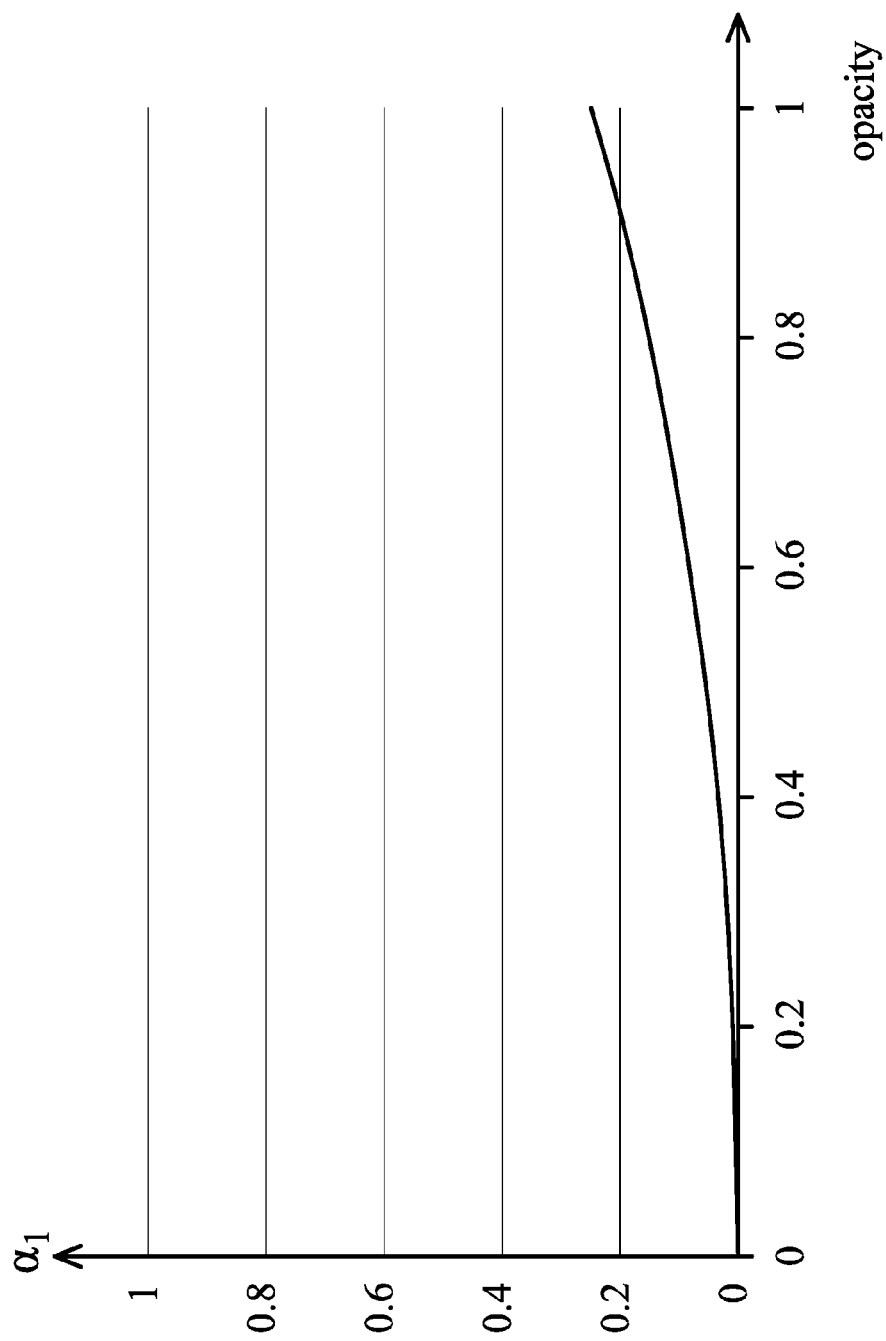
FIG. 2B is a diagram of an alpha curve of the transparent mode of an input image in accordance with an embodiment of the invention.
Figure 2C:
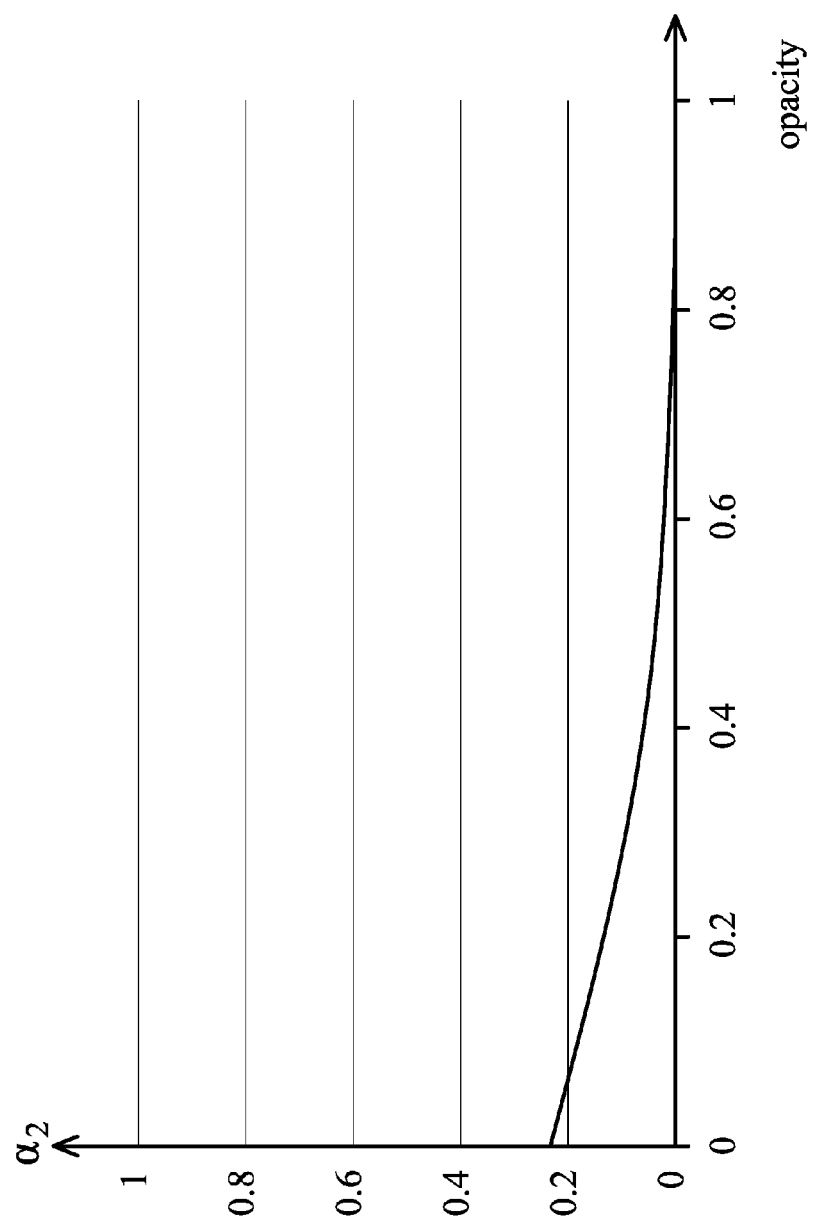
FIG. 2C is a diagram of an alpha curve of the opaque mode of an input image in accordance with an embodiment of the invention.

As mentioned above, one or more portions of the input image of the transparency display controller 130 can be set to a transparent mode or an opaque mode. More specifically, the transparency of the one or more portions of the input image to be rendered on the transparent display panel 150 can be defined by an "alpha" value that is a numeric value between 0 and 1, where a first alpha value and a second alpha value are assigned to the transparent mode and the opaque mode of a specific portion of the input image by the transparency display controller 130, respectively. FIG. 2B is a diagram of an alpha curve of the transparent mode for an input image in accordance with an embodiment of the invention. FIG. 2C is a diagram of an alpha curve of the opaque mode for an input image in accordance with an embodiment of the invention.

The transparency display controller 130 may calculate the opacity of each pixel in one or more portions in the input image from the display processor 120, and then determine the alpha values of the transparent mode or the opaque mode for the one or more portions of the input image to be rendered on the transparent display panel 150. If a specific portion of the input image received by the transparency display controller 130 is set to the transparent mode, the alpha curve $\alpha_1$ of the transparent mode can be expressed as:

$$\alpha_1 = b \times \left(\frac{\text{opacity}}{1.0}\right)^a \quad \text{(equation 2)}$$

Where a and b are pre-defined constants. The range of the calculated alpha curve $\alpha_1$ is between 0 and 1. When the opacity of the specific pixel is close to 1 in the transparent mode, the alpha value of the specific pixel will be increased, i.e. being more transparent. When the opacity of the specific pixel is close to 0 in the transparent mode, the alpha value of the specific pixel will be decreased, i.e. being less transparent, as shown in FIG. 2B. More specifically, the value of $\alpha_1$ is proportional to the opacity in equation (2) for FIG. 2B.

If a specific portion of the input image received by the transparency display controller 130 is set to the opaque mode, the alpha curve $\alpha_2$ of the opaque mode can be expressed as:

$$\alpha_2 = b \times \left(\frac{1 - \text{opacity}}{1.0}\right)^a \quad \text{(equation 3)}$$

where a and b are pre-defined constants. The range of the calculated alpha curve $\alpha_2$ is between 0 and 1. When the opacity of the specific pixel is close to 1 in the opaque mode, the alpha value of the specific pixel will be decreased, i.e. being less opaque. When the opacity of the specific pixel is close to 0 in the opaque mode, the alpha value of the specific pixel will be increased, i.e. being more opaque, as shown in FIG. 2C. More specifically, the value of $\alpha_2$ is inversely proportional to the opacity in equation (3) for FIG. 2C.

In an embodiment, when the transparent mode is used, the output pixel value of a specific pixel in each color channel in the output image can be defined as:

$$P_{out} = \alpha_1 * \text{total\_trans} + (1-\alpha_1) * P \quad \text{(equation 4)}$$

where total_trans denotes the fully transparent pixel value of the transparent display panel 150 (i.e. 0 or 255 depending on the embodiment type). The equation (4) can be regarded as a first alpha formula for the transparent mode.

when the opaque mode is used, the output pixel value a specific pixel in each color channel in the output image can be defined as:

$$P_{out} = \alpha_2 * \text{total\_opaq} + (1-\alpha_2) * P \quad \text{(equation 5)}$$

Where total_opaq denotes the fully opaque pixel value of the transparent display panel 150 (i.e. 0 or 255 depending on the embodiment type). The equation (5) can be regarded as a second alpha formula for the opaque mode.

Figure 3:
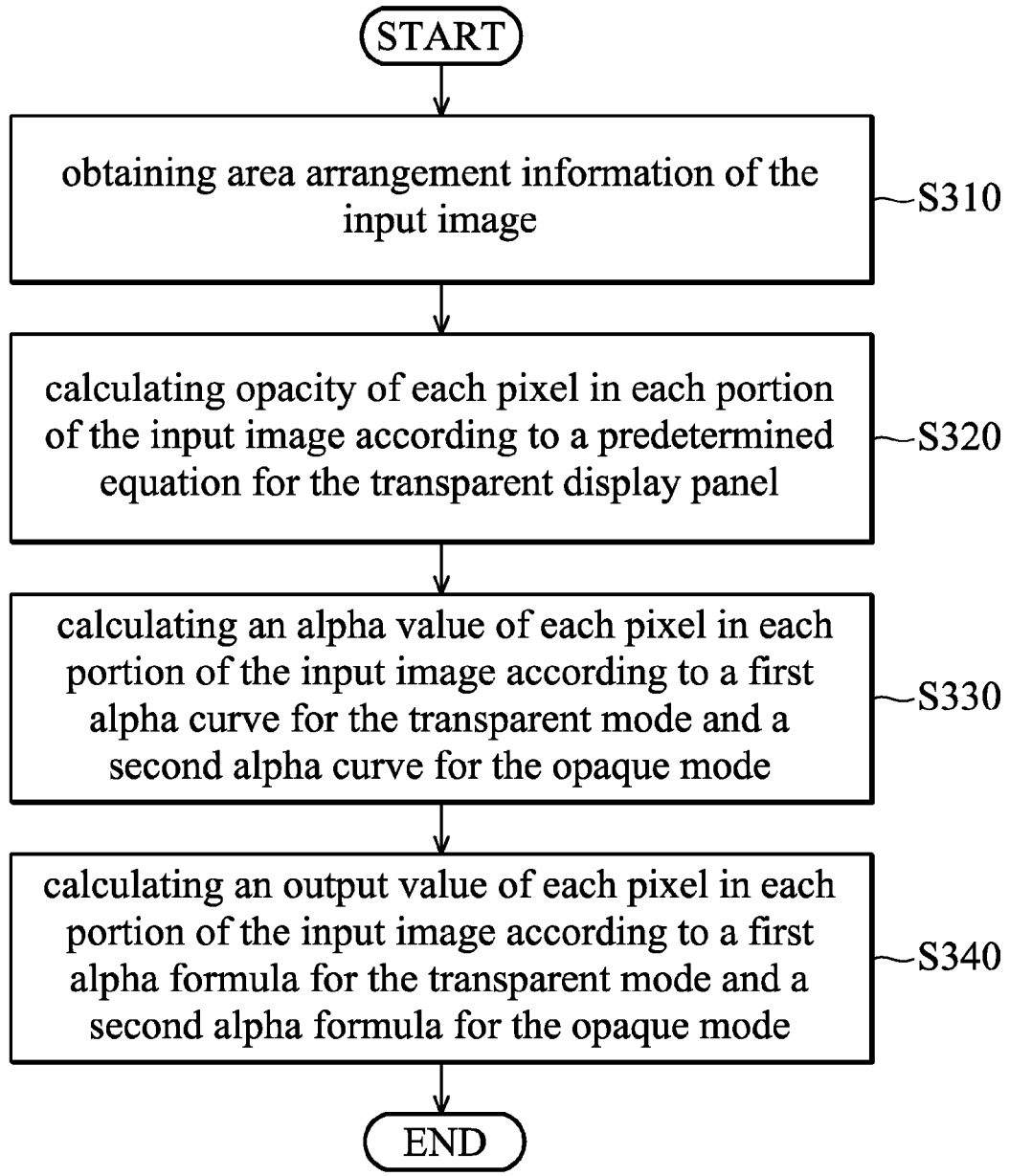
FIG. 3 is a flow chart of a transparency control method for area adaptive alpha control in accordance with an embodiment of the invention.

FIG. 3 is a flow chart of a transparency control method for area adaptive alpha control in accordance with an embodiment of the invention. Provided that the result is substantially the same, the steps are not required to be executed in the exact order shown in FIG. 3. The method may be employed by the transparency display controller 130, and may be briefly summarized as below.

In step S310, area arrangement information of the input image is obtained. For example, the transparency display controller 130 may define transparent and opaque portions in the input image. In an embodiment, the user may manually set whether a specific portion of the input image received by the transparency display controller 130 should be rendered in the transparent mode or in the opaque mode on the transparent display panel 150. Alternatively, a determination of whether a specific portion of the input image received by the transparency display controller 130 is rendered in the transparent mode or in the opaque mode on the transparent display panel 150 can be automatically made by software. For example, the input image of the transparency display controller 130 (i.e. output image from the display processor 120) may include a user interface (UI), a gaming area, an image area, and a video area. The UI area of the input image may remain unchanged, and the gaming area of the input image can be defined as a transparent portion. The static image area and video area of the input image can be defined as opaque portions because the user may want to see a more "opaque" image or video on the transparent display panel 150. Specifically, when a specific portion of the input image is defined as a transparent portion or an opaque portion by the transparency display controller 130, the associated alpha curve for the transparent mode (i.e. the first alpha curve) or the opaque mode (i.e. the second alpha curve) will be applied on the specific portion by the transparency display controller 130.

In step S320, opacity of each pixel in each portion of the input image is calculated according to a predetermined equation for the transparent display panel 150. For example, the predetermined equation (e.g. equation 1) can be obtained according to the pre-measured display characteristics of the transparent display panel 150.

In step S330, an alpha value of each pixel in each portion of the input image is calculated according to a first alpha curve for the transparent mode and a second alpha curve for the opaque mode. For example, the first alpha curve (i.e. $\alpha_1$) for the transparent mode is shown in FIG. 2B, and the second alpha curve (i.e. $\alpha_2$) for the opaque mode is shown in FIG. 2C.

In step S340, an output value of each pixel in each portion of the input image is calculated according to a first alpha formula for the transparent mode and a second alpha formula for the opaque mode. For example, the first alpha formula for the transparent mode can be referred to in equation 4, and the second alpha formula for the opaque mode can be referred to in equation 5. Accordingly, an output image to be displayed on the transparent display panel can be obtained.

Figure 4:
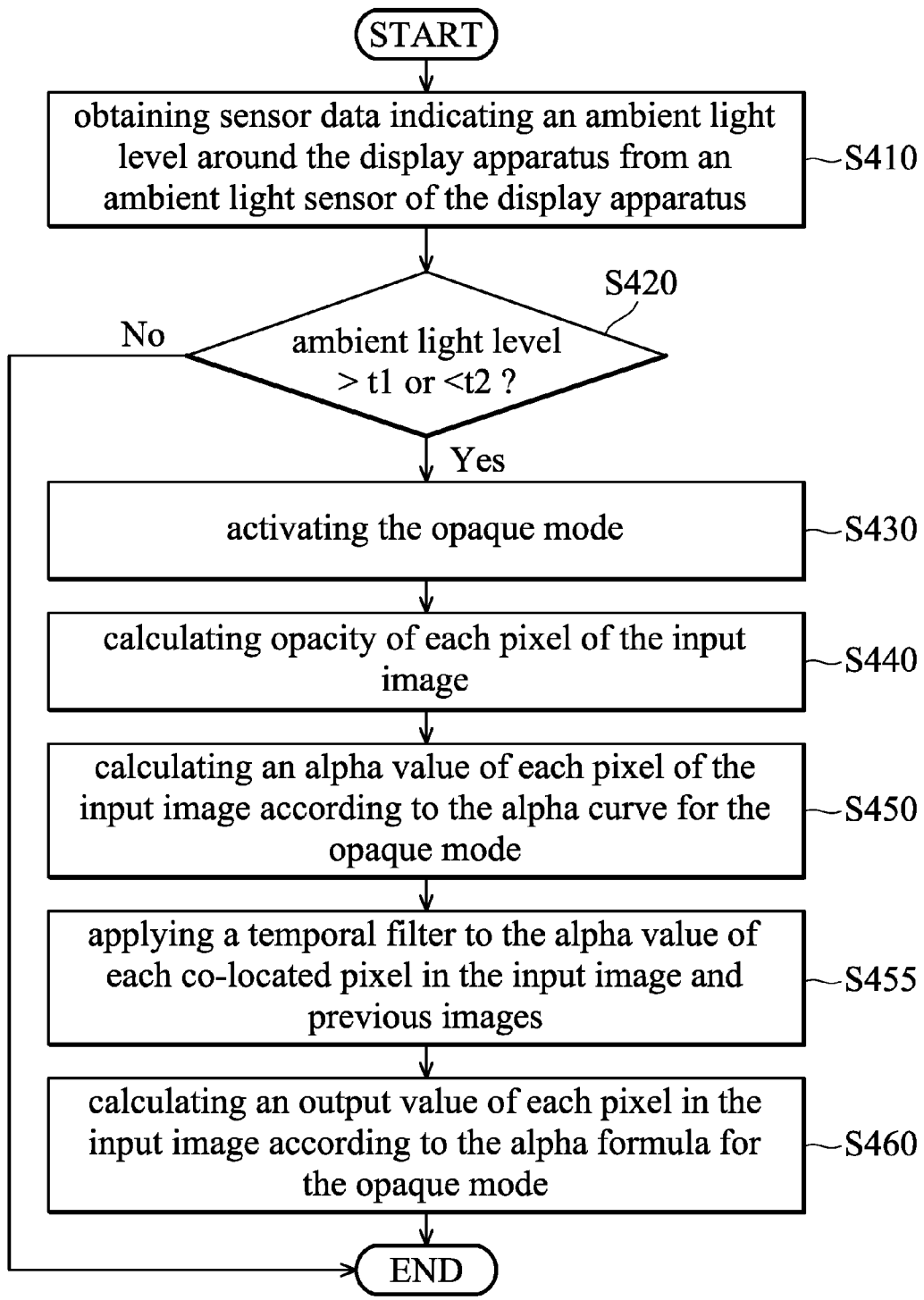
FIG. 4 is a flow chart of a transparency control method for ambient light adaptive alpha control in accordance with an embodiment of the invention.

FIG. 4 is a flow chart of a transparency control method for ambient light adaptive alpha control in accordance with an embodiment of the invention. Provided that the result is substantially the same, the steps are not required to be executed in the exact order shown in FIG. 4. The method may be employed by the transparency display controller 130, and may be briefly summarized as below.

In step S410, sensor data indicating an ambient light level around the display apparatus 100 is obtained from an ambient light sensor of the display apparatus 100. For example, the ambient light sensor 160 of the display apparatus 100 in of FIG. 1 detects ambient light (e.g. ambient light level) around the display apparatus 100 and provides detected sensor data indicating the ambient light level around the display apparatus 100 to the transparency display controller 130.

In step S420, it is determined whether the ambient light level is higher than a first threshold or lower than a second threshold. For example, step S420 is performed by the transparency display controller 130 to determine whether the ambient light around the display apparatus 100 is too bright or too dark. When the ambient light around the display apparatus 100 is too bright or too dark, it may be desired for the user to see more opaque images on the transparent display panel 150.

In step S430, the opaque mode of an input image received by the transparency display controller 130 is activated when it is determined that the ambient light level is lower than the first threshold or higher than the second threshold. It should be noted that when it is determined that the ambient light level between the first threshold and the second threshold, the input image will remain unchanged and be directly rendered on the transparent display panel 150. For example, the first and second thresholds are defined for a dark scene and a bright scene. When the ambient light level is lower than the first threshold, it indicates that the user may enter a dark scene (e.g. an indoor space). When the ambient light level is higher than the second threshold, it indicates that the user may enter a bright scene (e.g. an outdoor space in daylight). When it is determined that the ambient light is lower than the first threshold or higher than the second threshold, it may indicates that the user enters a dark scene or a bright scene, and thus it is desired to see a more "opaque" images on the transparent display panel 150 by the user.

In step S440, opacity of each pixel of the input image is calculated according to equation 1. In some embodiments, step S440 is not required to be performed exactly after step S430, and step S440 can be performed before step S410, S420, or S430.

In step S450, an alpha value of each pixel of the input image is calculated according to the alpha curve for the opaque mode. For example, the alpha curve $\alpha_2$ (i.e. equation 3) in FIG. 2C can be used in step S450.

In step S455, a temporal filter is applied to the alpha value of each co-located pixel in the input image and previous images. For example, the display apparatus 100 may be a mobile device that is carried by a user. When the user enters an outdoor space from an indoor space, the ambient light level will suddenly increase a lot. In this situation, the images rendered on the transparent display panel 150 should become more opaque, so that the user is capable of seeing images clearly in the outdoor space. The temporal filter used in step S455 is to make a smooth transparency transition of the images rendered on the transparent display panel 150, thereby enhancing user's experience. In some embodiments, step S455 can be omitted.

In step S460, an output value of each pixel in the input image is calculated according to the alpha formula for the opaque mode, such as equation 5.

Figure 5:
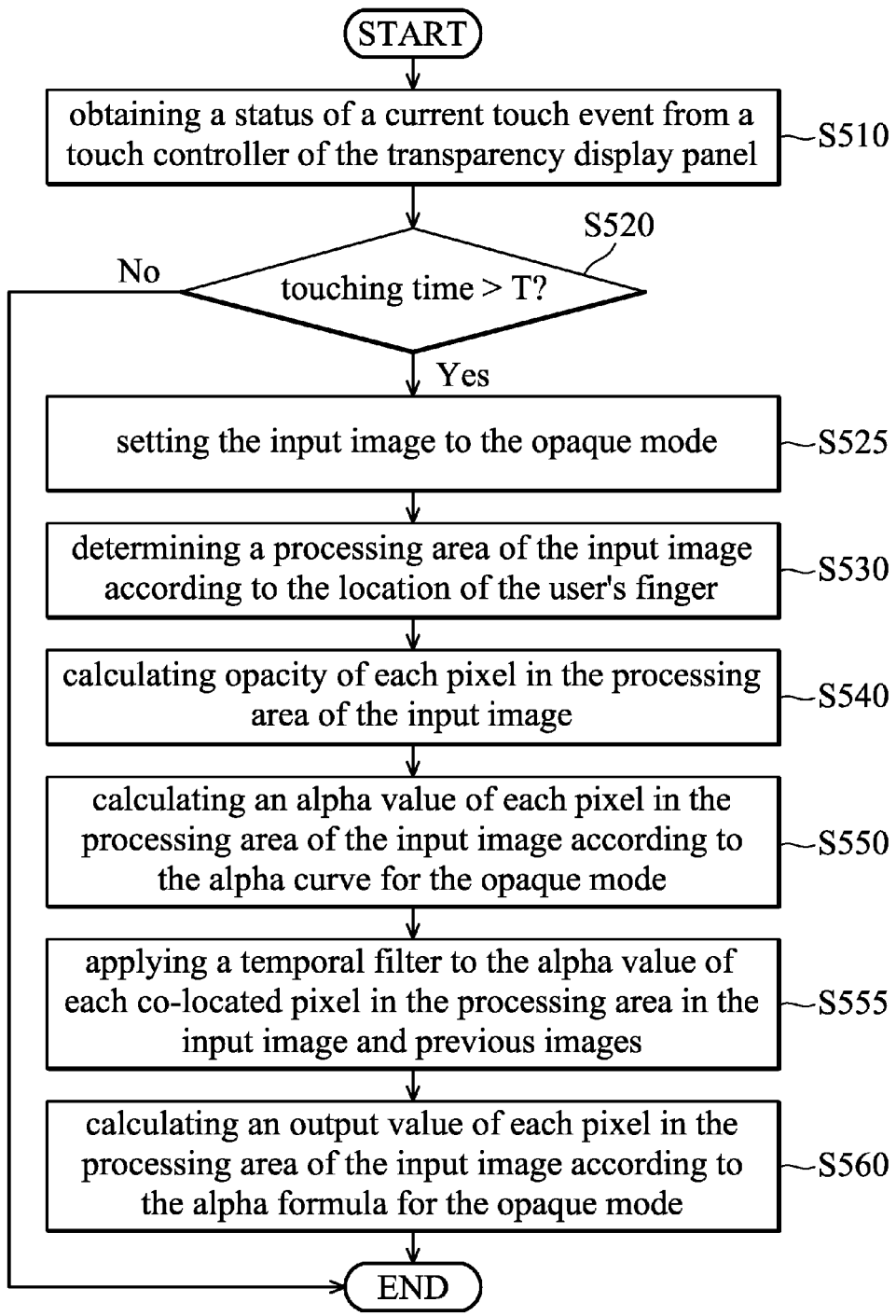
FIG. 5 is a flow chart of a transparency control method for a hand-follower function in accordance with an embodiment of the invention.

FIG. 5 is a flow chart of a transparency control method for a hand-follower function in accordance with an embodiment of the invention. In an embodiment, the transparent display panel 150 is further integrated with a touch module (not shown in FIG. 1) that is configured to detect touch events on the transparent display panel 150. The touch module includes a touch controller (not shown) capable of reporting the status of the current touch event to the transparency display controller 130, and the transparency display controller 130 may perform an associated transparency calculation according to the reported status of the current touch event from the touch controller. Provided that the result is substantially the same, the steps are not required to be executed in the exact order shown in FIG. 5. The method may be employed by the transparency display controller 130, and may be briefly summarized as below.

In step S510, the status of a current touch event is obtained from a touch controller of the transparent display panel 150. For example, the status may indicate the location and duration of the user pressing his or her hand/finger on the transparent display panel 150.

In step S520, it is determined whether the user's finger has been touching the transparent display panel 150 longer than a predetermined time. If it is determined that the user's finger has been touching the transparent display panel 150 longer than a predetermined time, the input image received by the transparency display controller 130 is set to the opaque mode (step S525). If it is determined that the user's finger has not been touching the transparent display panel 150 longer than a predetermined time, the transparency control method for a hand-follower function ends.

In step S530, the processing area of the input image is determined according to the position of the user's finger. For example, the processing area can be a portion of the input image, such as an icon or a local area around the touch position. The processing area can also be the whole input image.

In step S540, the opacity of each pixel in the processing area of the input image is calculated according to a predetermined equation for the transparent display panel 150, such as equation 1.

In step S550, the alpha value of each pixel in the processing area of the input image is calculated according to the alpha curve for the opaque mode. For example, the alpha curve $\alpha_2$ (i.e. equation 3) in FIG. 2C can be used in step S550.

In step S555, a temporal filter is applied to the alpha value of each co-located pixel in the processing area in the input image and previous images. Similarly, the temporal filter used in step S555 is to make a smooth transparency transition of the images rendered on the transparent display panel 150, thereby enhancing the user's experience. In some embodiments, step S555 can be omitted.

In step S560, an output value of each pixel in the processing area of the input image is calculated according to the alpha formula for the opaque mode, such as equation 5.

Figure 6:
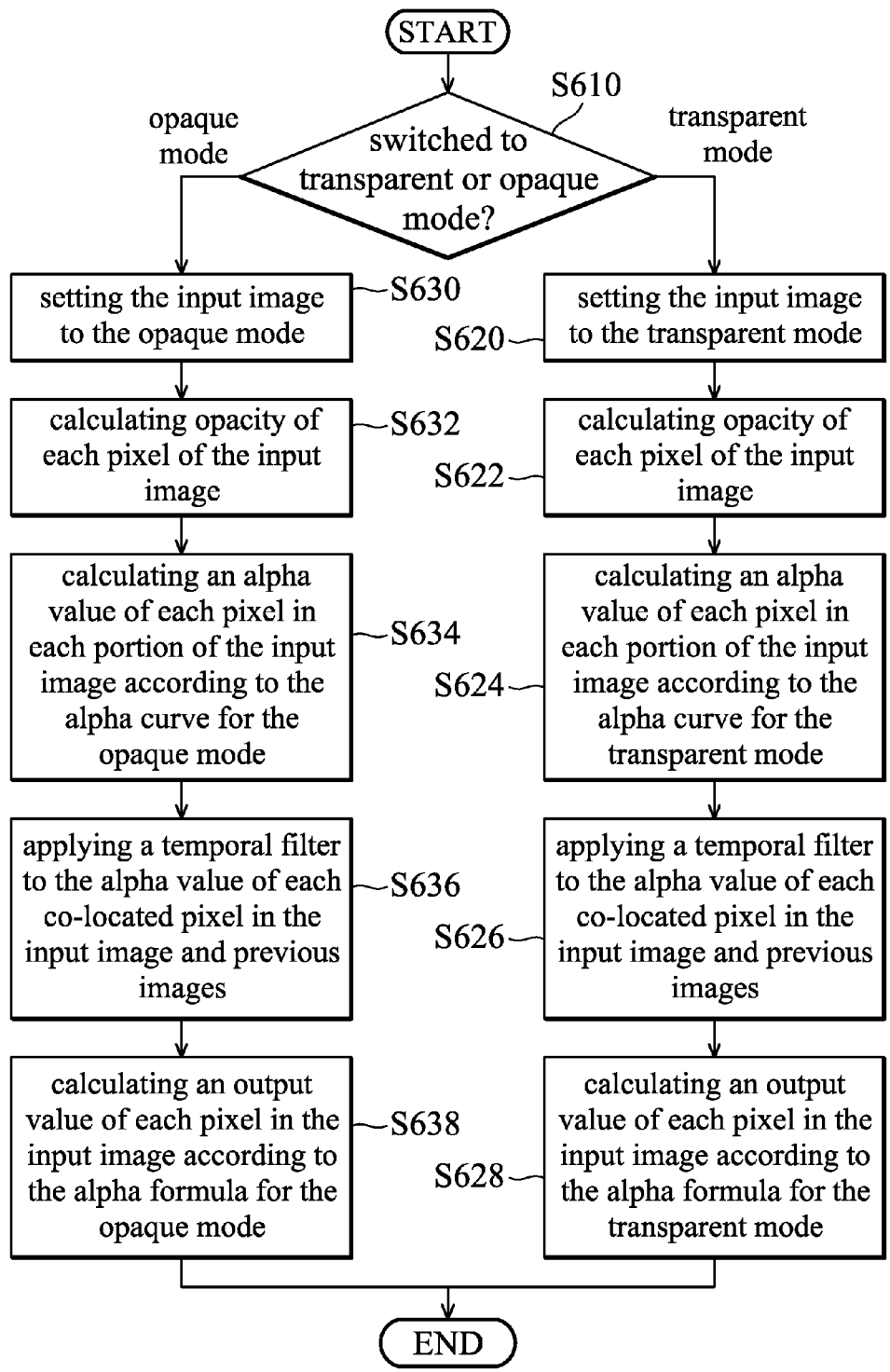
FIG. 6 is a flow chart of a transparency control method for switch control between the transparent mode and opaque mode in accordance with an embodiment of the invention.

FIG. 6 is a flow chart of a transparency control method for switch control between the transparent mode and opaque mode of one or more portions in the input image receive by the transparency display controller 130 in accordance with an embodiment of the invention. In an embodiment, the transparent mode or the opaque mode of the one or more portions of the input image to the transparency display controller 130 can be switched freely by the user. For example, the user may tap on a software button on the UI displayed on the transparent display panel 150 or press a hardware button of the display apparatus 100 to switch an output image to be rendered on the display panel 150 corresponding to the one or more portions of the input image received by the transparency display controller 130 between the transparent mode and the opaque mode. The output images during the transition between the transparent mode and the opaque mode should be processed, so that the user may experience a smooth transition. Provided that the result is substantially the same, the steps are not required to be executed in the exact order shown in FIG. 6. The method may be employed by the transparency display controller 130, and may be briefly summarized as below.

In step S610, it is determined whether the one or more portions of the input image received by the transparency display controller 130 are switched to the transparent mode or the opaque mode. If the transparency controller 130 determines the one or more portions of the input image are switched to the transparent mode, step S620 is performed. If the transparency controller 130 determines the one or more portions of the input image are switched to the opaque mode, step S630 is performed.

The steps S622~S628 and S632~S638 are dedicated for the transparent mode and the opaque mode, respectively, and the aforementioned embodiments can be referred to for descriptions of the operations performed in steps S622~S628 and S632~S638. Thus, the details for steps S622~S628 and S632~S638 will be omitted here.

Figure 7:
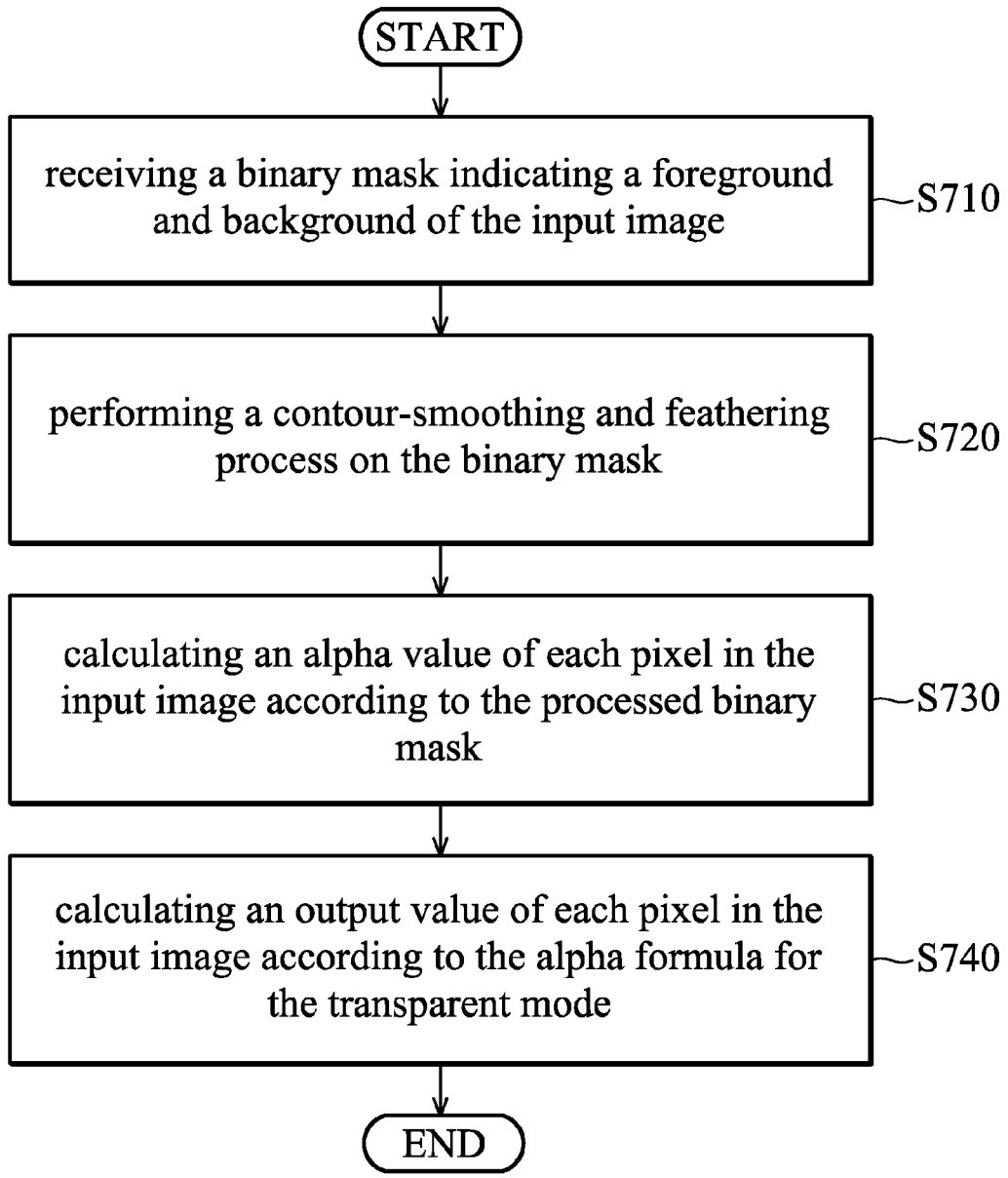
FIG. 7 is a flow chart of a transparency control method for foreground and background alpha control in accordance with an embodiment of the invention.

FIG. 7 is a flow chart of a transparency control method for foreground and background alpha control in accordance with an embodiment of the invention. In an embodiment, the display processor 120 may provide a binary mask indicating the foreground and background of the image to the transparency display controller 130. Thus, the transparency display controller 130 may perform specific transparency operations on the foreground object and the background. For example, the user may desire that the foreground object be more opaque, and that the background be more transparent.

In step S710, a binary mask indicating a foreground and background of the input image is received. The binary mask includes a binary flag for each pixel of the input image, where the binary flag indicate whether the pixel is belonging to the foreground or background. For example, when the binary flag is 1, it indicates that the pixel is a background pixel. When the binary flag is 0, it indicates that the pixel is a foreground pixel.

In step S720, a contour-smoothing and feathering process is performed on the binary mask. Thus, intermediate values between 0 and 1 can be obtained from the contour-smoothing and feathering process, and the intermedia values can be used on the contour of the foreground.

In step S730, an alpha value of each pixel in the input image is then obtained or calculated according to the processed binary mask. For example, after the contour-smoothing and feathering process, a foreground pixel may have an alpha value that is close to 0, and a background pixel may have an alpha value that is close to 1.

In step S740, the output value of each pixel in the input image is calculated according to the alpha formula for the transparent mode, such as equation 4. Thus, the background of the input image becomes more "transparent" since the background pixels have alpha values that are close to 1.

It should be noted that the aforementioned transparency control methods in FIGS. 3~7 can be used individually or in combination by the transparency display controller 130.

Figure 8:
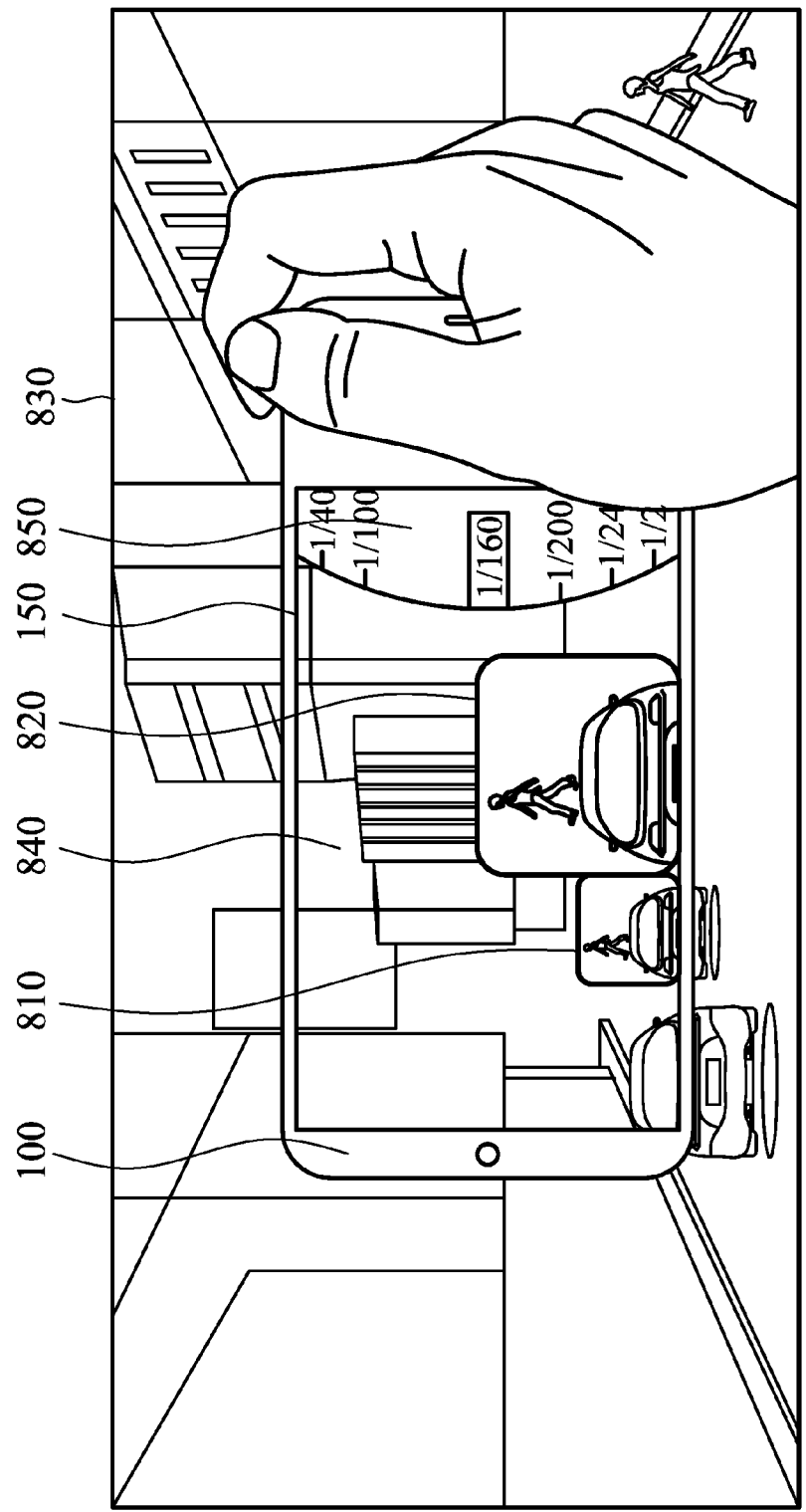
FIG. 8 is an example of simultaneously using various transparency control methods on the display apparatus in accordance with an embodiment of the invention.

FIG. 8 is an example of simultaneously using various transparency control methods on the display apparatus in accordance with an embodiment of the invention. As shown in FIG. 8, given that the display apparatus 100 is a smartphone, and the user is holding the display apparatus 100 in his or her right hand. The smartphone is capturing a street scene, and the user may see preview images on the transparent display panel 150.

For example, the user may tap on area 810 of the transparent display panel 150 for a zoom-in view of area 820. When the user taps on area 810, the transparency control method for the hand-follower function can be used, and the area 810 can be set to the opaque mode. Meanwhile, the user interface 850 for controlling the shutter speed of the smartphone is desired to be opaque and thus the transparency control method for area adaptive alpha control can be used. In addition, since the smartphone is being held by the user on the street, the ambient light sensor of the smartphone may report the ambient light level to the transparency display controller 130. Thus, the transparency control method for ambient light adaptive alpha control can also be used. Notably, the user may still see a view of the whole street via the transparent display panel 150 while the zooming-in view is activated.

In view of the above, various transparency control methods for transparent displays are provided. Transparency control is performed in one or more portions of the input image to the transparency display controller 130 according to "transparency indication information" associated with the one or more portions of the input image. For example, the display mode (e.g. transparent mode or opaque mode) of one or more portions of the input image received by the transparency display controller 130 is determined according to the transparency indication information associated with the one or more portions of the input image. Thus, the output image to be rendered on the transparent display panel 150 can be obtained according to the determined display mode of the one or more portions of the input image.

Specifically, in the embodiment of FIG. 3, the transparency indication information may indicate the area arrangement (e.g. UI area, gaming area, image area, and video area) information of the one or more portions of the input image for a transparent mode and an opaque mode. The area arrangement information of the input image can be provided by software settings. Alternatively, the area arrangement information of the input image can be defined by the user settings.

In the embodiment of FIG. 4, the transparency indication information may indicate whether the ambient light level around the display apparatus is lower than a first threshold or higher than a second threshold. In the embodiment of FIG. 5, the transparency indication information may indicate an area around a touch position of the detected touch event (i.e. could be a local touch area or a global area of the whole image) on the transparent display panel lasting longer than a predetermined time. In the embodiment of FIG. 6, the transparency indication information may indicate a mode switch signal (i.e. generated via a software or hardware button) to set the input image to the transparency display controller 130 to a transparent mode or an opaque mode. In the embodiment of FIG. 7, the transparency indication information may indicate a binary mask for separating foreground and background of the input image, and the foreground and background can be assigned with different alpha values.

With the assistance of the transparency control methods, the image quality and transmission efficiency of transparent displays can be enhanced.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controller, for generating an output image to be rendered on a transparent display panel, the controller configured to:
receive an input image;
calculate an opacity of each pixel in the input image according to a predetermined equation associated with the transparent display panel;
determine a display mode of one or more portions of the input image according to transparency indication information associated with the one or more portions of the input image, wherein the display mode corresponds to transparency of the one or more portions in the input image; and
obtain the output image to be displayed on the transparent display panel according to the determined display mode of the one or more portion of the input image,
wherein the transparency indication information indicates a binary mask for separating foreground and background of the input image,
wherein the controller further performs a contour-smoothing and feathering process on the binary mask, calculates an alpha value of each pixel in the one or more portions of the input image according to the processed binary mask, and calculates an output value of each pixel in the one or more portions of the input image according to a first alpha formula for a transparent mode of the display mode.

2. The controller as claimed in claim 1, wherein the display mode comprises the transparent mode and an opaque mode, and the transparency indication information further indicates area arrangement information of the one or more portions in the input image for one of the transparent mode and the opaque mode.

3. The controller as claimed in claim 2, wherein a first alpha value for the transparent mode of the input image and a second alpha value for the opaque mode of the input image are obtained according to the calculated opacity of each pixel in the input image.

4. The controller as claimed in claim 3, wherein each pixel in the output image is obtained by applying the first alpha formula for the transparent mode or a second alpha formula for the opaque mode on each pixel in the one or more portions of the input image.

5. The controller as claimed in claim 3, wherein the opacity of each pixel in the input image is obtained according to the predetermined equation which is estimated according to pre-measured display characteristics of the transparent display panel and color components of each pixel in the one or more portions of the input image.

6. The controller as claimed in claim 1, wherein the controller further receives an ambient light level around the transparent display panel detected by an ambient light sensor, and the transparency indication information further indicates whether the ambient light level is lower than a first threshold or higher than a second threshold;
wherein the controller further sets the input image to an opaque mode when it is determined that the ambient light level is lower than a first threshold or higher than a second threshold.

7. The controller as claimed in claim 1, wherein the controller further receives a touch event on the transparent display panel detected by a touch sensor, and the transparency indication information further indicates an area around a touch position of the detected touch event on the transparent display panel lasting longer than a predetermined time;
wherein the controller further sets the input image to an opaque mode around touch position when it is determined that the detected touch event on the transparent display panel lasts longer than the predetermined time.

8. The controller as claimed in claim 1, wherein the transparency indication information further indicates a mode switch signal to set the input image to the transparent mode or an opaque mode of the display mode.

9. A transparency control method for controlling transparency of an output image to be rendered on a transparent display panel, the method comprising:
receiving an input image;
calculating an opacity of each pixel in the input image according to a predetermined equation associated with the transparent display panel;
determining a display mode of one or more portions of the input image according to transparency indication information associated with the one or more portions of the input image, wherein the display mode corresponds to transparency of the one or more portions in the input image; and
obtaining the output image to be displayed on the transparent display panel according to the determined display mode of the one or more portions of the input image,
wherein the transparency indication information indicates a binary mask for separating foreground and background of the input image, and the method further comprises:
performing a contour-smoothing and feathering process on the binary mask;
calculating an alpha value of each pixel in the one or more portions of the input image according to the processed binary mask; and
calculating an output value of each pixel in the one or more portions of the input image according to a first alpha formula for a transparent mode of the display mode.

10. The method as claimed in claim 9, wherein the display mode comprises the transparent mode and an opaque mode, and the transparency indication information further indicates area arrangement information of the one or more portions in the input image for one of the transparent mode or the opaque mode.

11. The method as claimed in claim 10, further comprising:
obtaining a first alpha value for the transparent mode and a second alpha value for the opaque mode according to the calculated opacity of each pixel of the input image.

12. The method as claimed in claim 11, further comprising:
obtaining each pixel in the output image by applying the first alpha formula for the transparent mode or a second alpha formula for the opaque mode on each pixel in the one or more portions of the input image.

13. The method as claimed in claim 11, further comprising:
obtaining the opacity of each pixel in the input image according to the predetermined equation which is estimated according to pre-measured display characteristics of the transparent display panel and color components of each pixel in the input image.

14. The method as claimed in claim 9, further comprising:
receiving an ambient light level around the transparent display panel detected by an ambient light sensor; and
setting the input image to an opaque mode when it is determined that the ambient light level is lower than a first threshold or higher than a second threshold,
wherein the transparency indication information further indicates whether the ambient light level is lower than a first threshold or higher than a second threshold.

15. The method as claimed in claim 9, further comprising:
receiving a touch event on the transparent display panel detected by a touch sensor, wherein the transparency indication information further indicates an area around a touch position of the detected touch event on the transparent display panel lasting longer than a predetermined time; and setting the transparent display panel to enter an opaque mode around touching position when it is determined that the detected touch event on the transparent display panel lasts longer than the predetermined time.

16. The method as claimed in claim 9, wherein the transparency indication information further indicates a mode switch signal to set the input image to the transparent mode or an opaque mode of the display mode.

* * * * *